Figure 9:
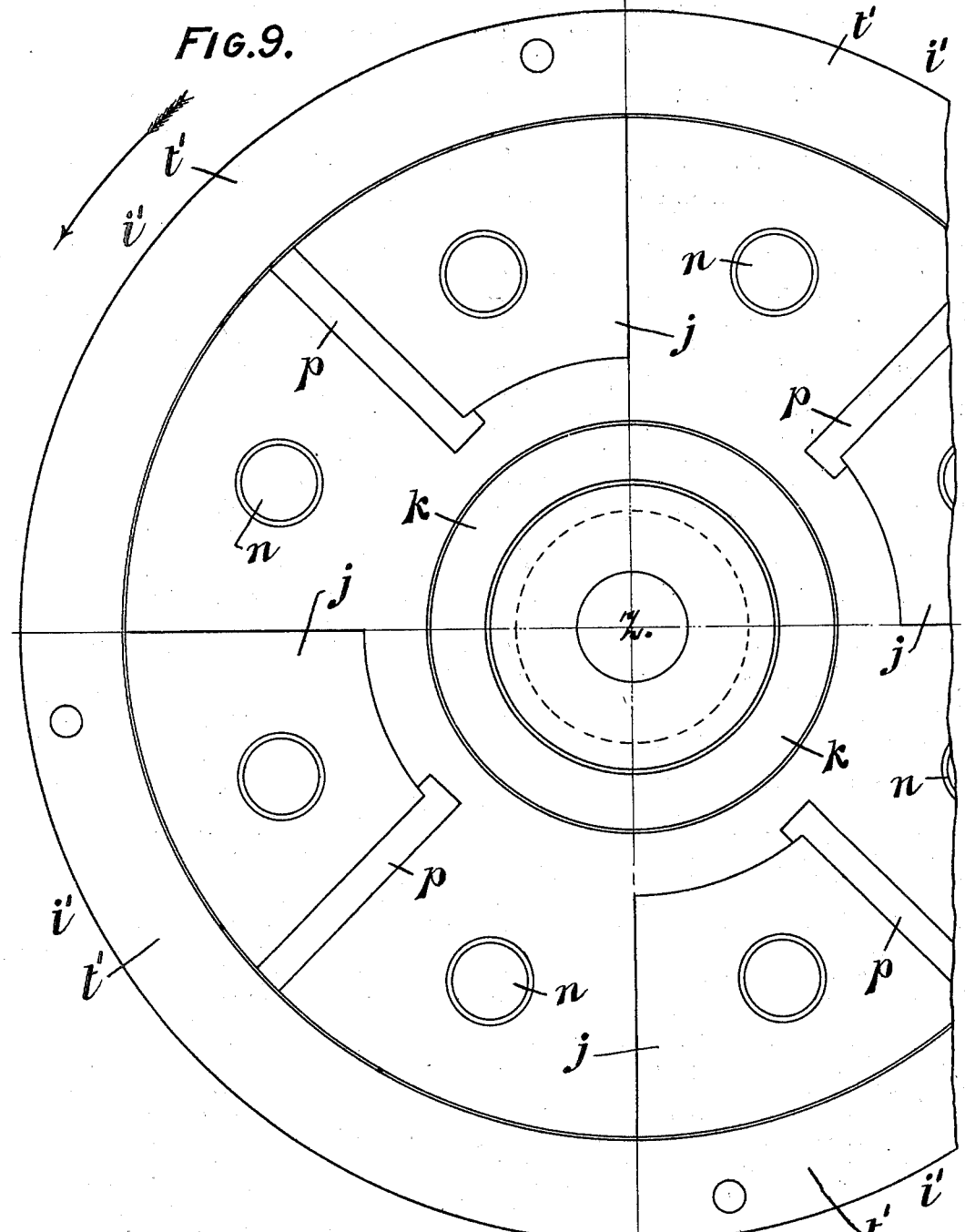

No. 699,356. Patented May 6, 1902.
J. VERITY, Dec'd.
W. W. WHITE, Ancillary Executor.
COUPLING FOR SHIPS' PROPELLER SHAFTS.
(Application filed Feb. 24, 1902.)
(No Model.) 5 Sheets—Sheet 1.
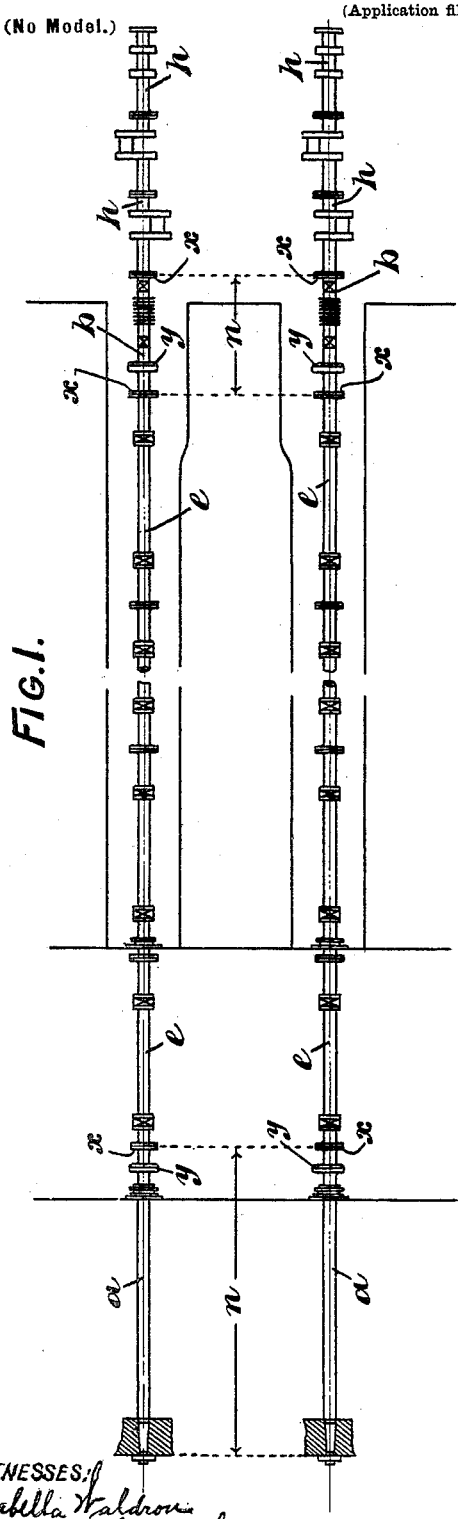
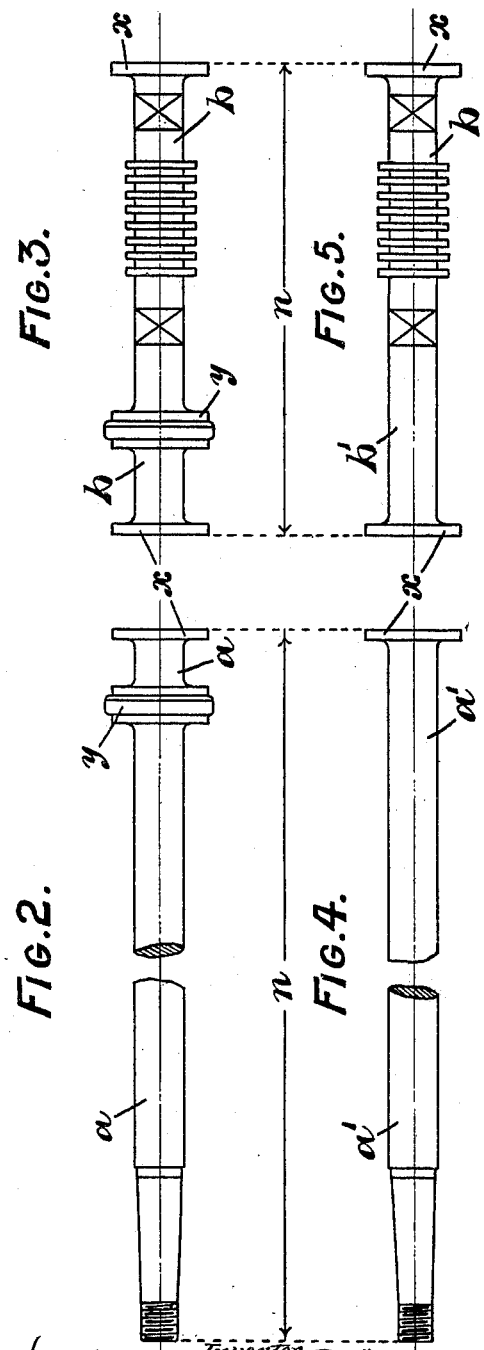

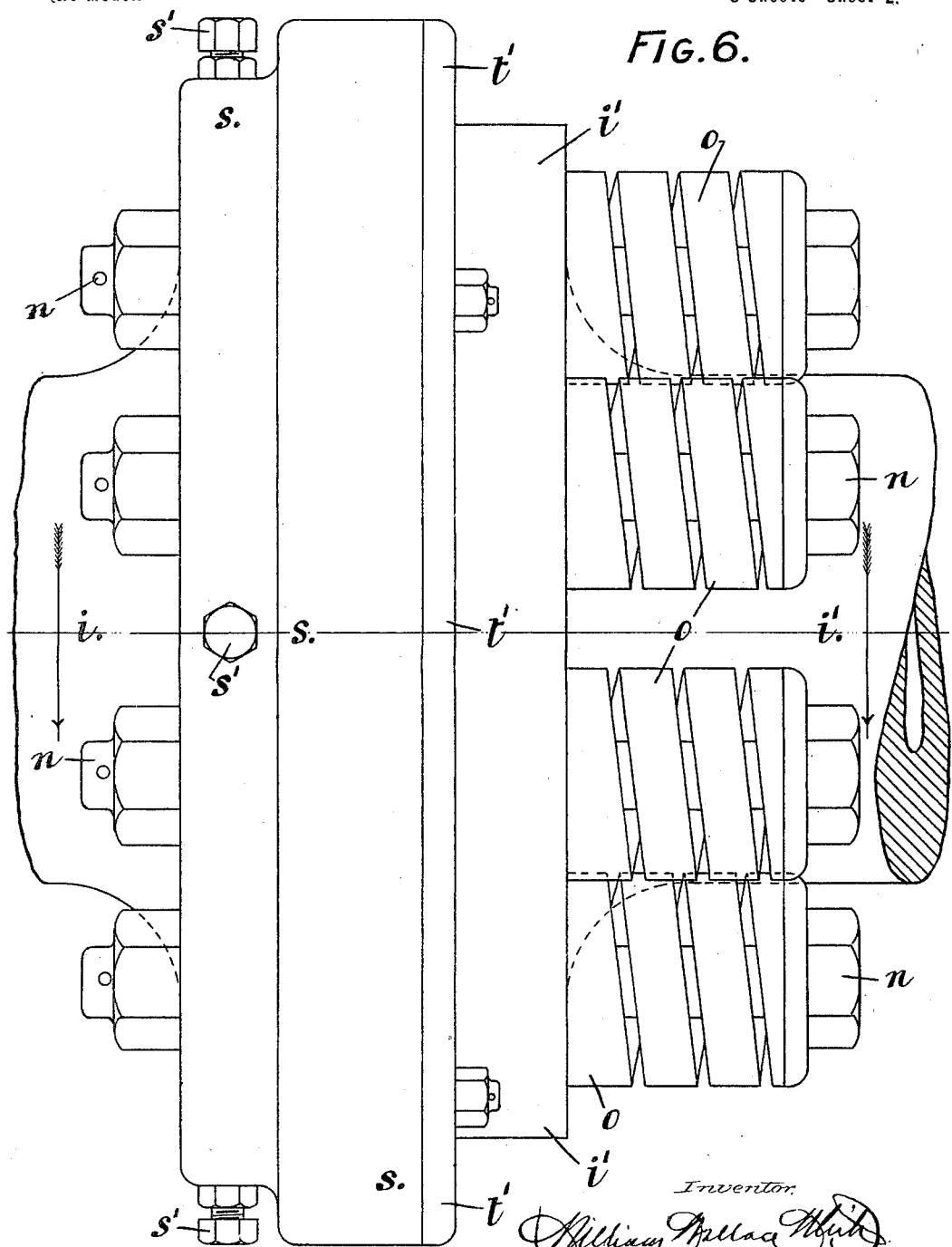

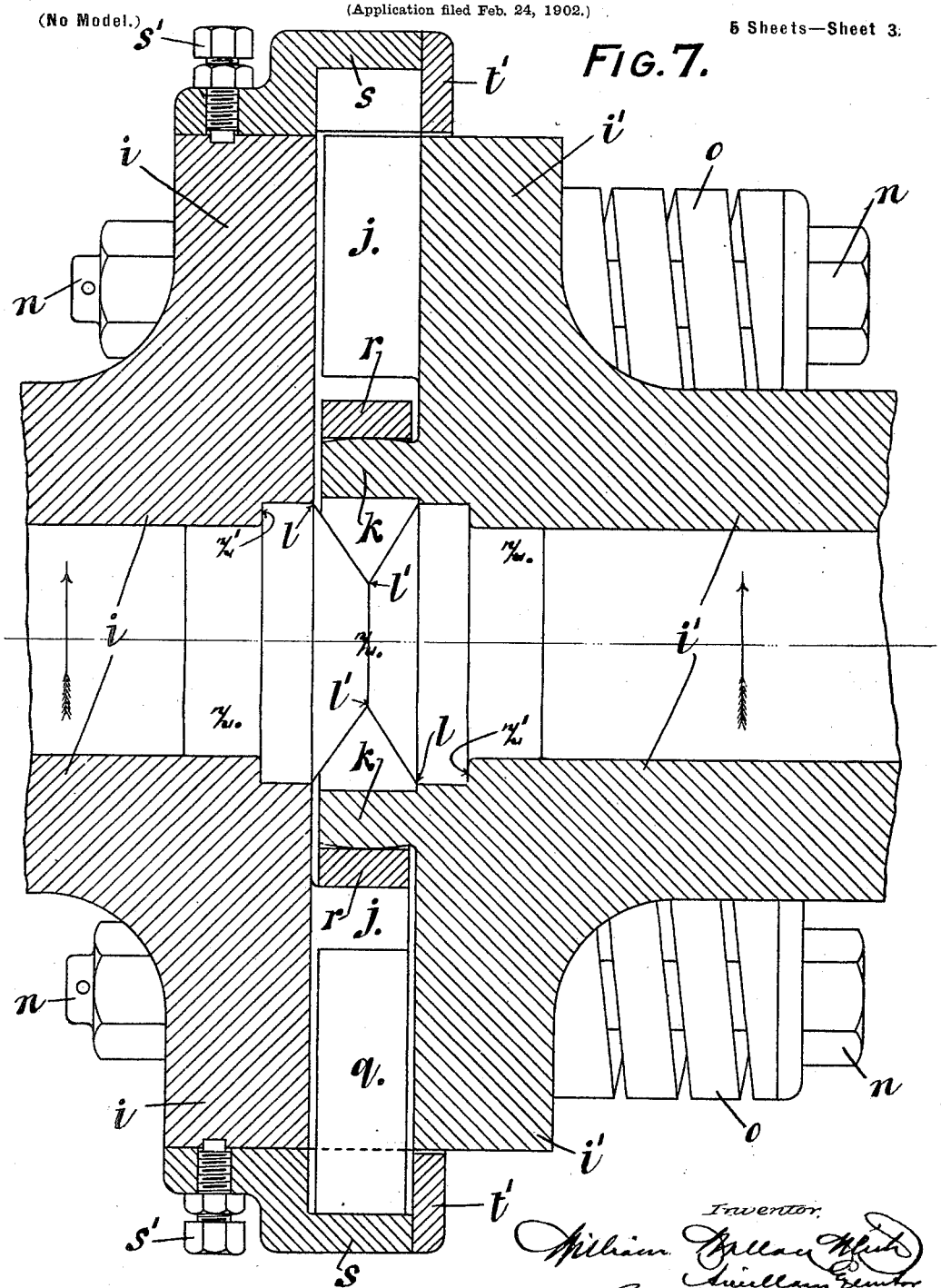

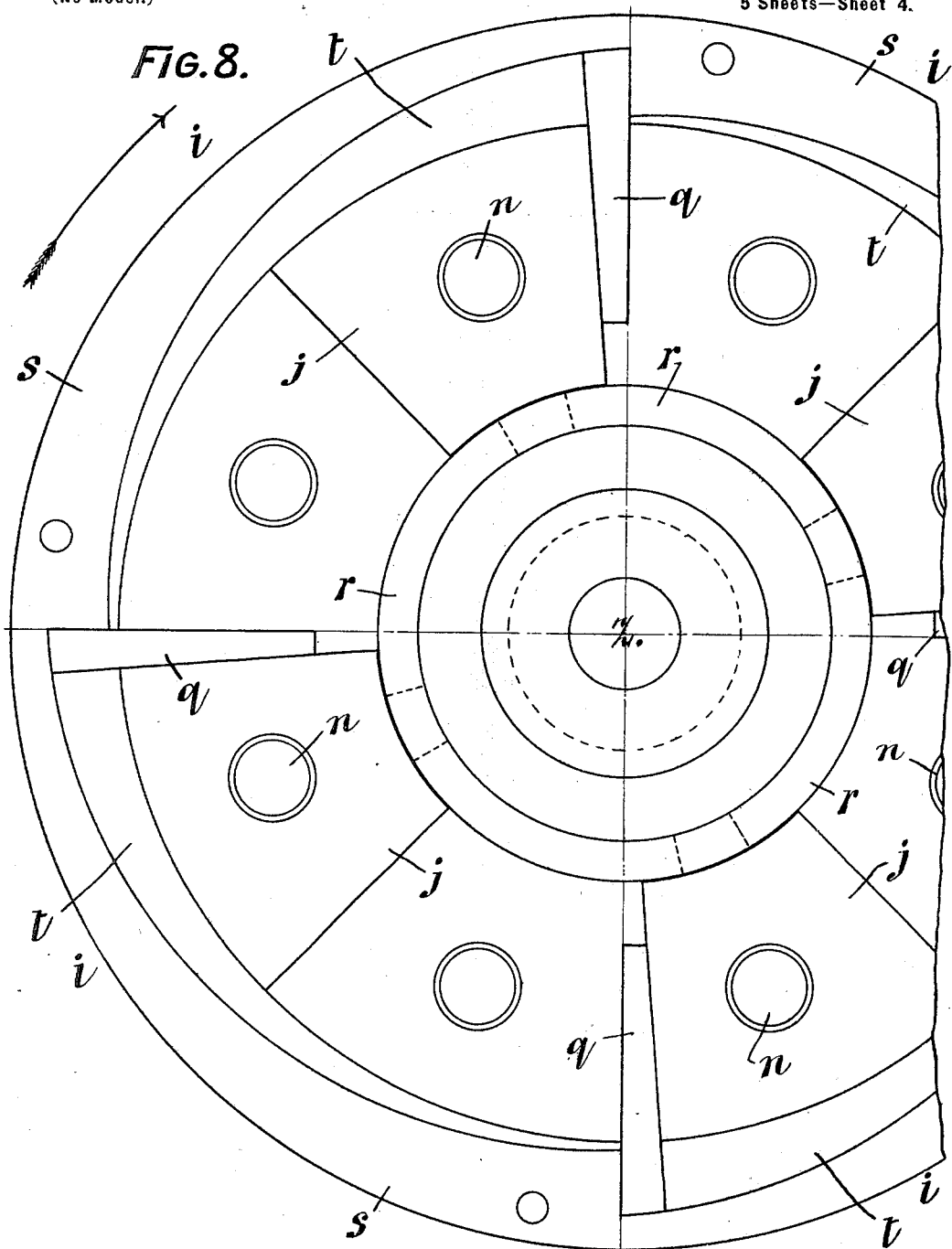

No. 699,356. Patented May 6, 1902.
J. VERITY, Dec'd.
W. W. WHITE, Ancillary Executor.
COUPLING FOR SHIPS' PROPELLER SHAFTS.
(Application filed Feb. 24, 1902.)
(No Model.) 5 Sheets—Sheet 5.

UNITED STATES PATENT OFFICE.

WILLIAM WALLACE WHITE, OF NEW YORK, N. Y., ANCILLARY EXECUTOR OF JOHN VERITY, DECEASED.

COUPLING FOR SHIPS' PROPELLER-SHAFTS.

SPECIFICATION forming part of Letters Patent No. 699,356, dated May 6, 1902.

Application filed February 24, 1902. Serial No. 95,261. (No model.)

*To all whom it may concern:*

Be it known that JOHN VERITY, who was a subject of the King of England, and a resident of 35 Rufford road, Fairfield, Liverpool, in the county of Lancaster, England, but is now deceased, did invent certain new and useful Improvements in the Coupling of Ships' Propeller Shafts or Shafting, of which the following is a specification.

This invention has reference to propeller-shafting of ships having twin or multiple propeller-shafts and propellers, and wherein flexible or non-rigid devices of the kind which are specially adapted to turn in one direction normally—namely, either to the right or to the left—are employed; and the invention has for its object and effect to provide improvements in the shafting of twin or multiple propeller-ships, whereby the cost and expense of spare portions of shafts adapted for use in case of the breakdown of any length of shafting containing a flexible device would be small or not abnormal, and to improve said coupling generally.

Drawings illustrating the invention are annexed hereto, in which—

Figure 1 shows a plan of shafting of a twin-screw ship with the improvements applied to it, while Figs. 2 and 3 are details showing special pieces or lengths of shafting employed at the stem portion and near the crank-shaft or forward portion, respectively. Figs. 4 and 5 show the spare shafts or pieces to be used in lieu of the shafts shown in Figs. 2 and 3, respectively, in case of their failure. Fig. 6 is a side elevation of the special form of coupling used herein, and Fig. 7 is a section of same. Figs. 8 and 9 are face views of the respective parts of the flexible device.

The propeller-shafting of ships between the engines and screws comprise a plurality of shaft lengths each of which has a coupling-flange at the ends, except, of course, the "tail-shaft," which has only one flange, and these are secured together by bolts passed through them in the usual manner. It has been proposed to employ flexible devices in shafts of this kind for the purpose of preventing the breakage of such shafting, which generally occurs in the length having the thrust-rings next the engine-shaft or the fore length of the shafting which passes through the tunnels of the ship, and also in the tail-shaft length or the aft length of the tunnel-shafting. In the application of such devices, however, they have been applied by making the meeting ends of two of the lengths of shafting of special construction of flexible or non-rigid character in order to obtain the flexibility required; but in the case of those devices which are specially adapted to rotate normally in one direction only—namely, to the right or to the left, as in the case of twin-screw propellers—great expense is incurred with regard to the "spare" portions of shafts which are required to be carried by a ship for use in the event of breakdown. By the present invention these defects are obviated, while at the same time the construction of coupling is improved—namely, according to this invention, by the construction of shafting illustrated in the drawings. The shaft lengths in which flexibility is required are at their ends provided with ordinary coupling-flanges $x$, and these are bolted together in the well-known manner; but within one or more of these lengths—namely, between the flanges $x$—a special flexible device is employed, which is generally designated $y$ in the drawings. In the drawings this flexible device $y$ is provided on the tail-shaft length and on the thrust-shaft length and at a point intermediate the ends of these lengths. These special lengths are designated $a$ and $b$, respectively, while the other lengths are designated $e$. The devices $y$ are placed within the neighborhood of the greatest bending moments, tending to fracture the shafts. The lengths of the spare shafting which would be carried by the ship to be used in case of failure in the lengths $a$ and $b$ would be equal to the distance $n$—viz., the length between the face of the flange $x$ and the end of the piece in the case of the tail length $a$ and between the faces of the flanges $x$ in the case of the thrust length $b$. Thus in the case of either one or other of the lengths $a$ or $b$ in either shaft becoming damaged and it being necessary to substitute a new length—say on the voyage or away from home—a spare length (marked $a'$ and $b'$, respectively, in Figs. 4 and 5) equal in length to the distance $n$ could be introduced and used in its stead, no matter which of the shafts it may be, and would be bolted up to the flanges on the shafting $e$ or $e$ and $h$, as the case may be, in the ordinary way.

Referring now to the construction of flexible device shown in Figs. 6 to 9 of the drawings, the two parts of the hollow shaft are provided with the disks or bosses $i$ and $i'$, and each of the disks or bosses $i$ and $i'$ are provided with projections or jaws $j$ at intervals, around their faces, as shown, so that when the two ends of the shaft to be coupled are brought together, the projections $j$ on the disk of one part of the shaft enter the recesses formed by two adjacent projections on the disk of the other, in the usual manner of this type of coupling. On the disk or boss $i'$ an annular ring $k$ is provided, as shown. It has been found by experience with this type of coupling that sufficient bearing-surface between the two ends of shaft coupled must be provided; but at the same time provision is necessary for movement of these ends. Now in order to provide ample bearing-surface for the ends of the two parts of the shaft when coupled, while at the same time permitting movement of same, the ends of the hollow shaft are provided with the heads or tapering bearing-pieces $z$, having shoulders $z'$, which bear against the interior of the disks $i$ and $i'$, and these heads are reduced from the point $l$ to the point $l'$, as shown, the actual bearing-surface of the heads $z$ being $l'\,l'$. This construction admits of the shaft ends adjusting themselves should their axes become out of alinement through any cause. These heads or tapered bearing-pieces $z$ when worn may be removed and others inserted in the shaft.

In order to keep the two parts of the shaft in contact with each other, eight bolts $n$ are passed through the disks or bosses $i\,i'$ at about the center of each of the projections or jaws $j$. These bolts fit loosely into their bolt-holes in order to permit of movement of the bolt therein.

$o$ represents spring-washers provided on each bolt, which normally hold the parts $i$ and $i'$ in close contact, but permit of their separating when in action, if necessary.

In order to firmly secure the two parts of the device transversely, parallel keys $p$ and wedges $q$ are provided. The keys $p$ are lipped on the under side, as shown, so as to prevent them from flying outward, and a ring $r$ is also passed over $k$ for the purpose of holding up the keys from the inside. An adjusting-ring $s$, with internal cams $t$, is provided, which latter act or bear on the outer ends of the wedges and adjust and retain them in position. This ring $s$ is secured to the head or boss $i$ by screws $s'$, and a covering ring-plate $t'$ is secured to the adjusting-ring $s$.

The device as illustrated in Figs. 6 to 9 is adapted to turn only in the direction of the arrows. In a coupling for turning in a contrary direction the converse arrangement of wedge-pieces $q$ and keys $p$ is adopted.

What is claimed in respect of the herein-described invention is—

1. In a multiple-propeller ship's shafting, the combination of the engine crank-shaft $h$; the thrust-ring length $b$ next same, having at each end an ordinary coupling-flange $x$, and a flexible device $y$ in said length between said flanges; a tail-shaft $a$ at the stern end of which the propeller is fastened, having an ordinary coupling-flange $x$ at its forward end, and a flexible device $y$ between this flange and the stern end; and a plurality of lengths $e$ between the shafts $a$ and $b$, each length having ordinary coupling-flanges $x$ at their ends; substantially as set forth.

2. In a ship's propeller-shaft comprising a plurality of lengths, a length of shafting having a coupling-flange $x$ at each end, and between these ends a flexible device consisting of a flange $i$ on one part of the shaft with projections $j$ on its inner face, a flange $i'$ on the other part having projections $j$ on its inner face adapted to fit in the spaces between the projections $j$ of the other flange; oppositely-disposed bearing-heads $z$, with shoulders $z'$ fitting in and supported in the ends of said shaft, and inwardly-tapering bearing-faces; substantially as set forth.

3. In a ship's propeller-shaft comprising a plurality of lengths, a length of shafting having a coupling-flange $x$ at each end, and between these ends a flexible device consisting of a flange $i$ on one part of the shaft with projections $j$ on its inner face, a flange $i'$ on the other part having projections $j$ on its inner face, adapted to fit in the spaces between the projections $j$ of the other flange, oppositely-disposed bearing-heads $z$, with shoulders $z'$ fitting in and supported in the ends of said shaft, and inwardly-tapering bearing-faces; keys $p$ fitting between two of the adjacent faces or edges of the projecting parts $j$, wedges $q$ disposed between the other adjacent edges of said parts $j$, a wedge-holding cam-ring $s$ fitting over the flanges $i\,i'$, having cam-recesses $t$ in which the ends of the wedges $q$ work, a projecting annular flange or ring $k$ on the flange $i'$, and a ring $r$ fitting outside and on the ring $k$, and supporting the inner ends of the keys $p$, and a plurality of bolts $n$ and springs $o$, said bolts passing through said flanges $i$ and parts $j$; substantially as set forth.

WILLIAM WALLACE WHITE,
*Ancillary executor of the estate of John Verity, deceased.*

Witnesses:
OTTO MUNK,
CHAS. W. ALDOUR.